United States Patent [19]

Mazin et al.

[11] Patent Number: 4,866,658
[45] Date of Patent: Sep. 12, 1989

[54] HIGH SPEED FULL ADDER

[75] Inventors: Moshe Mazin, Andover; Dennis A. Henlin, Dracut; Edward T. Lewis, Sudbury, all of Mass.

[73] Assignee: Raytheon Company, Lexington, Mass.

[21] Appl. No.: 244,549

[22] Filed: Sep. 12, 1988

Related U.S. Application Data

[63] Continuation of Ser. No. 73,292, Jul. 10, 1987, abandoned, which is a continuation of Ser. No. 648,930, Sep. 10, 1984, abandoned.

[51] Int. Cl.⁴ .................................................. G06F 7/50
[52] U.S. Cl. ........................................................ 364/784
[58] Field of Search ............................... 364/784–788

[56] References Cited

U.S. PATENT DOCUMENTS

| | | | |
|---|---|---|---|
| 4,052,604 | 10/1977 | Maitland et al. | 364/786 |
| 4,417,314 | 11/1983 | Best | 364/785 |
| 4,425,623 | 1/1984 | Russell | 364/787 |
| 4,471,454 | 9/1984 | Dearden et al. | 364/786 |
| 4,523,292 | 6/1985 | Armer | 364/786 |
| 4,621,338 | 11/1986 | Uhlenhoff | 364/786 |

FOREIGN PATENT DOCUMENTS

| | | | |
|---|---|---|---|
| 59-5348 | 1/1984 | Japan | 364/784 |
| 59-139446 | 8/1984 | Japan | 364/784 |

OTHER PUBLICATIONS

Article entitled "LSI'S for Digital Signal Processing", by N. Ohwada, T. Kimura and M. Doken, IEEE Journal of Solid-State Circuits, vol. SC-14, No. 2, Apr. 1979, pp. 214–220.

Primary Examiner—Gary V. Harkcom
Assistant Examiner—Long T. Nguyen
Attorney, Agent, or Firm—Philip J. McFarland; Richard M. Sharkansky

[57] ABSTRACT

A high speed full adder circuit is shown to include logic circuitry responsive to the levels of the two digital signals to be added for: (a) immediately producing an appropriate carry signal when the levels of the digital signals are the same; and (b) inverting the carry signal into such adder when the levels of the digital signals differ.

1 Claim, 1 Drawing Sheet

HIGH SPEED FULL ADDER

This application is a continuation of application Ser. No. 073,292 filed July 10, 1987, now abandoned, which is a continuation of application Ser. No. 648,930 filed Sept. 10, 1984, now abandoned.

BACKGROUND OF THE INVENTION

This invention pertains in general to large scale integrated (LSI) circuits and in particular to binary adders used in such circuits.

As is known, a binary adder is one of the basic building blocks of a digital computer, so the speed at which a binary adder may be operated directly affects the speed of a digital computer. It is of particular importance that the speed of a binary adder be maximized for use in LSI circuits. A relatively high speed full adder using the well-known CMOS technology, as described in an article entitled "LSI's for Digital Signal Processing" by N. Ohwada, T. Kimura and M. Doken, IEEE Journal of Solid-State Circuits, Vol. SC-14, No. 2, April 1979, pp. 214–220, incorporates an exclusive-OR type adder in combination with transfer gates. The addition of the transfer gates increases the speed of operation significantly as compared to a conventional full adder using only exclusive-OR gates. Unfortunately, however, there is a logic delay associated with developing the requisite carry output signal. That is to say, the transfer gates that develop carry output signals are controlled by either $A \oplus B$ or $\overline{A \oplus B}$ logic signals (where A and B are the signals to be added) so the delay inherent in developing either one of such logic signals limits the speed of operation.

SUMMARY OF THE INVENTION

With the foregoing background of the invention in mind, it is an object of this invention to provide an LSI full adder wherein the status of the A and B input signals directly determines the carry output signal.

It is another object of this invention to provide complementary pairs of full adder cells that may be directly connected to reduce delay to a minimum.

The foregoing and other objects of this invention are generally attained by interconnecting a first adder cell having A, $\overline{B}$ and $C_{IN}$ inputs and a sum output and an inverse carry output with a complementary full adder cell having A, B and $\overline{C}_{IN}$ inputs and an inverse sum output and a carry output. In both adder cells, serially connected pairs of p-channel and n-channel field effect transistors (FETS) are used to generate the carry output signals in response to the status of the A, $\overline{B}$ and B input signals.

BRIEF DESCRIPTION OF THE DRAWINGS

For a more complete understanding of this invention, reference is now made to the following description of the accompanying drawings, wherein.

DESCRIPTION OF THE PREFERRED EMBODIMENT

Figure 1:
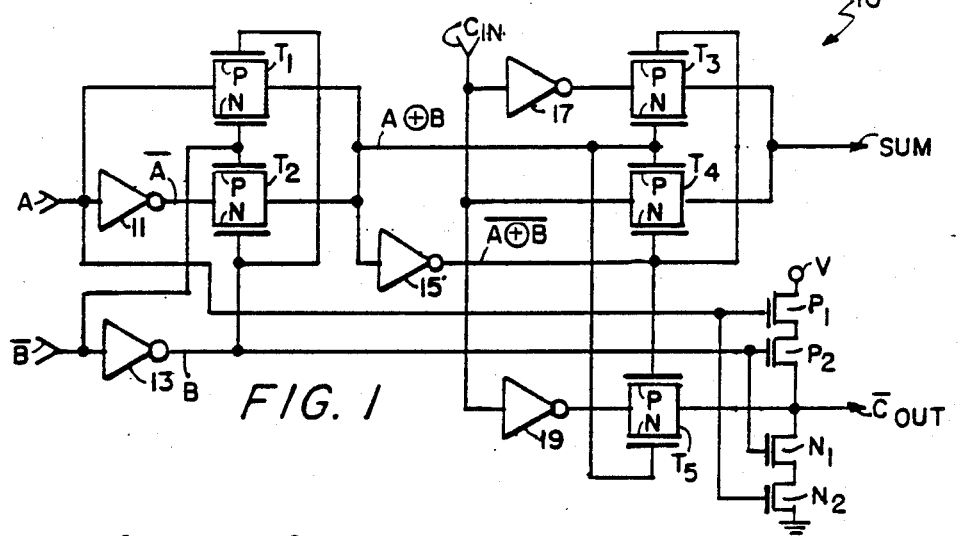
FIG. 1 is a schematic diagram of a full adder cell according to this invention.

Before referring to the drawings, it will be noted that the invention would preferably be implemented using the known LSI technique commonly called CMOS. That is to say, the circuits (shown in block form in the drawings to illustrate the logic underlying this invention) would ordinarily be formed on a common substrate using CMOS elements.

Referring now to FIG. 1, a full adder 10 according to this invention here is shown to receive A, $\overline{B}$ and $C_{IN}$ (carry in) inputs and to provide S (sum) and $\overline{C}_{OUT}$ (inverse carry-out) outputs. The truth table for the full adder 10 is presented in Table 1.

TABLE 1

| A | $\overline{B}$ | $C_{IN}$ | S | $\overline{C}_{OUT}$ |
|---|---|---|---|---|
| 0 | 1 | 0 | 0 | 1 |
| 0 | 1 | 1 | 1 | 1 |
| 0 | 0 | 0 | 1 | 1 |
| 0 | 0 | 1 | 0 | 0 |
| 1 | 1 | 0 | 1 | 1 |
| 1 | 1 | 1 | 0 | 0 |
| 1 | 0 | 0 | 0 | 0 |
| 1 | 0 | 1 | 1 | 0 |

From the foregoing truth table it will be apparent to one of skill in the art that the following Boolean equations obtain:

$S = (A \oplus B) \overline{C} + \overline{(A \oplus B)} C$
Eq. (1)

$\overline{S} = (A \oplus B) C + (A \oplus \overline{B}) \overline{C}$
Eq. (2)

$C_{OUT} = (A \oplus B) C + (A . B)$
Eq. (3)

$\overline{C}_{OUT} = (A \oplus B) \overline{C} + (\overline{A} . \overline{B})$
Eq. (4)

The A input signal is shown to be applied to: (a) the input terminal of an inverter 11, (b) the input terminal of a transmission gate $T_1$, and (c) the gate terminals of a p-channel FET, $P_1$, and an n-channel FET, $N_2$. The $\overline{B}$ input signal is applied to: (a) the input terminal of an inverter 13, (b) the n-channel terminal of the transmission gate $T_1$, and (c) the p-channel terminal of a transmission gate $T_2$. The B signal on the output of the inverter 13 is applied to (a) the p-channel terminal of the transmission gate $T_1$, (b) the n-channel terminal of the transmission gate $T_2$, and (c) the gate terminals of a p-channel FET, $P_2$, and an n-channel FET, $N_1$.

Digressing briefly here now for a moment, it will be appreciated by those of skill in the art that a transmission gate represents a manner of connecting MOS transistors that is unique to CMOS logic. In general, the transmission gate is effective to pass the signals appearing at the input terminal of the device to the output terminal of the device when the n-channel gate terminal is at the logic "1" level and the p-channel gate terminal is at the logic "0" level. Conversely, when the n-channel terminal is at the logic "0" level and the p-channel terminal is at the logic "1" level, the transmission gate is in its OFF condition (i.e., there will be no transmission through the device).

From the foregoing it should now be appreciated that inverters 11 and 13 and transmission gates $T_1$ and $T_2$ are effective to create the A⊕B signal and an inverter 15 is effective to create the $\overline{A \oplus B}$ signal. The A⊕B signal is applied to: (a) the n-channel gate terminals of transmission gates $T_3$ and $T_5$, and (b) the p-channel gate terminal of transmission gate $T_4$. The $\overline{A \oplus B}$ signal is applied to: (a) the n-channel gate terminal of transmission gate $T_4$, and (b) the p-channel gate terminals of transmission gates $T_3$ and $T_5$. The carry in, $C_{IN}$, signal is applied: (a) via an inverter 17, to the input terminal (not numbered) of the transmission gate $T_3$, (b) to the input terminal of transmission gate $T_4$, and (c) via an inverter 19, to the input terminal of the transmission gate $T_5$.

The sum (S) output is generated by the inverter 17 and the transmission gate $T_3$ or the transmission gate $T_4$. Thus, S is a logic "1" when (A⊕B) is a logic "1" and the carry in ($C_{IN}$) is a logic "0" (i.e. transmission gate $T_3$ operative) or when (A⊕B) is a logic "0" and $C_{IN}$ is a logic "1" (i.e. transmission gate $T_4$ operative).

The inverse carry-out, $\overline{C_{OUT}}$, is a logic "1" when both A and B inputs are a logic "0" (this condition is referred to as the "carry/generate" mode). Conversely, the inverse carry-out, $\overline{C_{OUT}}$, is a logic "0" if both A and B inputs are a logic "1" (this condition is referred to as the "carry/kill" mode). The p-channel FETs $P_1$ and $P_2$ that are gated by the A and B inputs, respectively, generate the inverse carry-out, $\overline{C_{OUT}}$) in the "carry generate" mode by connecting a voltage source V to $\overline{C_{OUT}}$, and the n-channel FET's $N_1$ and $N_2$, gated respectively by the B and A inputs, are effective to generate the inverse carry out, $\overline{C_{OUT}}$, in the "carry kill" mode by connecting $\overline{C_{OUT}}$ to ground. When the (A⊕B) signal is a logic "1" the inverse carry-out, $\overline{C_{OUT}}$, is the inverse of $C_{IN}$ (this condition is referred to as the "carry/propagate" mode). In this mode the inverter 19 inverts the $C_{IN}$ signal and passes such signal through the transmission gate $T_5$ (activated by means of the (A⊕B) signal applied to the n-channel gate terminal of such gate) to $\overline{C_{OUT}}$.

It should be noted here that there is a logic delay associated with the generation of the inverse carry-out, $\overline{C_{OUT}}$, only in the "carry/propagate" mode. That is to say, the inverse carry-out, $\overline{C_{OUT}}$, signal in both the "carry/generate" and the "carry/kill" modes is immediately generated, depending on the status of the A and B input signals, while in the "carry propagate" mode the $\overline{C_{OUT}}$ signal is not generated until the (A⊕B) signal is formed to actuate the transmission gate $T_5$.

Figure 2:
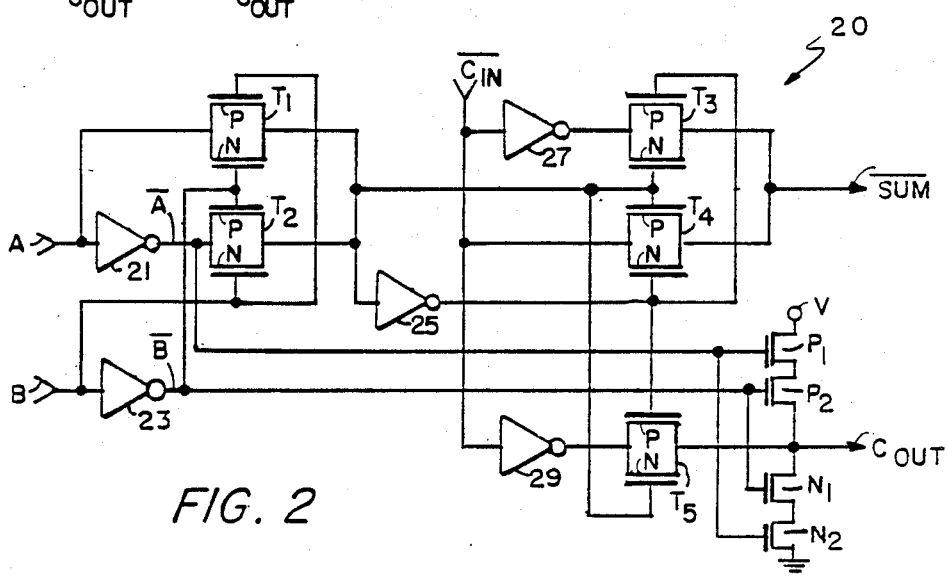
FIG. 2 is a schematic diagram of a complementary adder to that of FIG. 1 that is provided to correctly maintain the polarity of the carry signal in an array.

Referring now to FIG. 2, a full adder 20 that is the complement of the full adder 10 (FIG. 1) is shown to receive A, B and $\overline{C_{IN}}$ input signals and to provide inverse sum ($\overline{S}$) and carry-out ($\overline{C_{OUT}}$) output signals. The full adder 20 was developed in order to correctly maintain the polarity of the carry signal in an array of such adders Thus, the full adder 10 (FIG. 1) provides an inverse carry-out, $\overline{C_{OUT}}$, output signal and receives a $C_{IN}$ input signal, while the full adder 20 receives an inverse carry, $\overline{C_{IN}}$, signal and develops a carry-out, $C_{OUT}$, output signal.

The full adder 20 operates in a similar manner to the full adder 10 (FIG. 1). As mentioned above, the inputs to the full adder are A, B and $\overline{C_{IN}}$ and the outputs are $\overline{\text{Sum}}$ and $C_{OUT}$. Inverters 21, 23 and 25 form the (A⊕B) and $\overline{(A \oplus B)}$ signals. It should be noted here that the full adder 10 (FIG. 1) has a $\overline{B}$ input, whereas the full adder 20 has a B input. The connections to the transmission gates $T_1$ and $T_2$ are reversed from those shown in FIG. 1 in the full adder 20 to handle the polarity change. The full adder 20 uses the A⊕B signal and its complement to generate a $\overline{\text{Sum}}$ output through inverter 27 and transmission gates $T_3$ and $T_4$, and a $C_{OUT}$ output signal through inverter 29 and transmission gate $T_5$. As discussed above, the carry signals are formed by FETS $P_1$, $P_2$, $N_1$, $N_2$ except that the FETS $P_1$, $P_2$ and $N_1$, $N_2$ are gated by A and $\overline{B}$ signals rather than A and B signals in order to maintain the proper polarity of the $C_{OUT}$ signal.

Referring now to both FIGS. 1 and 2, it should be noted that the generation or killing of the CARRY signal directly at the CARRY output node offers speed advantages over prior art adder cells. That is to say, while the Sum output and the $C_{OUT}$ output in the carry propagate mode (i.e., when the $C_{OUT}$ signal is developed in transmission gate $T_5$) are both generated in approximately 2.5 gate delays, the $C_{OUT}$ signal in the "carry kill" and "carry generate" modes is generated significantly faster. Further, utilizing the adders 10 and 20 in tandem while alternating the carry output, $C_{OUT}$, signal, results in a reduction of the carry propagation delay by one gate delay per pair.

Figure 3:
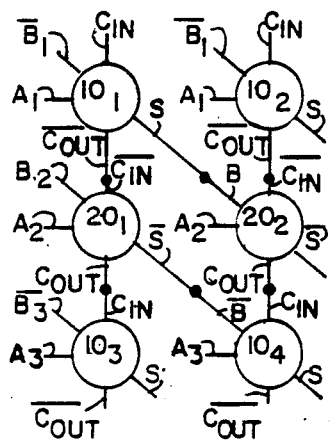
FIG. 3 is a sketch illustrating how the adders of FIGS. 1 and 2 may be combined in an array.

Referring now to FIG. 3, the manner in which the adders 10 (FIG. 1) and 20 (FIG. 2) are combined to form an array of such devices is illustrated. Adders $10_1$ and $10_2$ are shown to receive $A_1$ and $\overline{B}_1$ input signals from a bank of registers (not shown). Adder $20_1$ (the complement of adder $10_1$) is shown to receive $A_2$ and $B_2$ inputs from the registers (not shown) and the $\overline{C_{IN}}$ input is the inverse carry-out, $\overline{C_{OUT}}$, from adder $10_1$. Adder $20_2$ (the complement of adder $20_2$) receives an $A_2$ input from the registers (not shown), the B input is the Sum output from adder $10_1$, and the $\overline{C_{IN}}$ input is the inverse carry-out, $\overline{C_{OUT}}$, output from adder $10_2$. Adder $10_3$ receives $A_3$ and $\overline{B}_3$ inputs from the registers (not shown) and the $C_{IN}$ input is the carry-out, $C_{OUT}$, output of adder $20_1$. Adder $10_4$ receives an $A_3$ input from the registers (not shown), the $\overline{B}$ input is the inverse sum, $\overline{S}$, output from adder $20_1$, and the $C_{IN}$ input is the carry-out, $C_{OUT}$, output from adder $20_2$.

Finally, it should be noted that because of the desire to maintain symmetry between the complementary adders 10 (FIG. 1) and 20 (FIG. 2), the adder 10 (FIG. 1) requires an inverse B or $\overline{B}$ input. The requirement for such an input is not deemed to limit the utility of that device because the input signals to such adder cells are generally obtained from registers, from which both non-inverted and inverted outputs are available.

Having described a preferred embodiment of the invention, it will now be apparent to one of skill in the art that other embodiments incorporating its concept may be used. It is felt, therefore, that this invention should not be restricted to the disclosed embodiment, but rather should be limited only by the spirit and scope of the appended claims.

What is claimed is:

1. A full adder circuitry wherein two digital input signals, A and B, and a digital carry-in signal, each of which signals having either a logic one or a logic zero level, may be combined to produce the EX-OR (Exclusive OR) of A and B, the inverse of such EX-OR signal, a sum signal and a digital carry-out signal, improved circuitry for forming the digital carry-out signal comprising:

(a) inverter means, responsive to the digital carry-in signal, for inverting the digital carry-in signal;

(b) first gating means, including a first pair of FETS connected to form a transmission gate, responsive to the EX-OR signal and to the inverse of the EX-OR signal, to pass the inverted digital carry-in signal when the logic level of the EX-OR signal is one and the logic level of the inverse of the EX-OR signal is zero;

(c) second gating means, including a second pair of FETS serially connected to form a first gate, immediately responsive to the digital input signals, A and B, when the logic levels of both of the digital input signals are one, to produce a carry signal having a logic one level;

(d) third gating means, including a third pair of FETS serially connected to form a second gate immediately responsive to the digital input signals when the logic levels of both of the digital input signals, A and B, are zero, to produce a carry signal having a logic zero level; and (e) means for combining the signals produced by the first, second and third gating means to produce the desired carry-out signal.

* * * * *